(12) United States Patent
Sharapov

(10) Patent No.: US 9,850,633 B1
(45) Date of Patent: Dec. 26, 2017

(54) METHOD AND STRUCTURE FOR DAMPENING TSUNAMI WAVES

(71) Applicant: Sergey Sharapov, San Francisco, CA (US)

(72) Inventor: Sergey Sharapov, San Francisco, CA (US)

( * ) Notice: Subject to any disclaimer, the term of this patent is extended or adjusted under 35 U.S.C. 154(b) by 84 days.

(21) Appl. No.: 15/252,123

(22) Filed: Aug. 30, 2016

(51) Int. Cl.
*E02B 3/04* (2006.01)
*E02B 3/06* (2006.01)

(52) U.S. Cl.
CPC .............. *E02B 3/062* (2013.01); *E02B 3/041* (2015.09); *E02B 3/046* (2013.01)

(58) Field of Classification Search
CPC ................................ E02B 3/041; E02B 3/062
USPC ..................................................... 405/25, 28
See application file for complete search history.

(56) References Cited

U.S. PATENT DOCUMENTS

| | | | | |
|---|---|---|---|---|
| 4,006,598 | A * | 2/1977 | Hulsemann | E02B 3/06 405/25 |
| 5,294,211 | A * | 3/1994 | Niimura | E02B 3/062 405/26 |
| 6,935,808 | B1 * | 8/2005 | Dempster | B63B 35/44 405/25 |
| 8,714,875 | B2 * | 5/2014 | Morii | E02B 7/44 210/170.1 |
| 8,814,469 | B2 * | 8/2014 | McCormick | E02B 3/062 405/21 |
| 8,931,976 | B2 | 1/2015 | Kawahara et al. | |
| 2001/0055516 | A1 * | 12/2001 | King | E02B 3/06 405/28 |
| 2006/0088381 | A1 * | 4/2006 | Manzone | E02B 3/06 405/31 |
| 2012/0148346 | A1 * | 6/2012 | Eftekharzadeh | E02B 3/104 405/92 |
| 2014/0227033 | A1 | 8/2014 | Scheel | |

FOREIGN PATENT DOCUMENTS

| | | |
|---|---|---|
| CN | 203742023 | 7/2014 |
| EP | 2206835 | 7/2010 |
| RU | 2524814 | 2/2013 |
| WO | WO2013035794 | 3/2013 |

* cited by examiner

*Primary Examiner* — Benjamin Fiorello

(57) ABSTRACT

A tsunami-wave structure is provided for installation in the bottom of the sea/ocean in the near-shore area which is exposed to the air at the time of a low tide that precedes the arrival of tsunami. Normally, the structure is immersed in water and when exposed to air before arrival of the tsunami wave assumes a tsunami-wave dampening position under the effect of its own gravity. This is achieved by making the structure in the form of a two-lever mechanism having two lever arms separated by a fulcrum point with a counterweight attached to the end of one the lever arms and a tsunami-wave breaker pivotally connected to the end of the other lever arm so that when the structure is exposed to the air the tsunami-wave breaker is turned down and allows the counterweight to outweigh the tsunami-wave breaker and to raise it to the operation position.

18 Claims, 7 Drawing Sheets

METHOD AND STRUCTURE FOR DAMPENING TSUNAMI WAVES

FIELD OF THE INVENTION

The present invention relates to a method and structure for dampening tsunami waves, in particular to a method and a structure which act on the basis of the phenomenon of a very low tide, or so called "drawdown," "negative wave" or "withdrawal" that precedes the arrival of a destructive tsunami wave to the shore line.

BACKGROUND OF THE INVENTION

Many coastal areas have a risk of high tsunami sea waves which may cause the death of coastal inhabitants and huge damage to cities and industrial and cultural buildings and infrastructure. The problem of protection from the oncoming water flows and accompanying phenomena is one of the most significant contemporary problems of human life.

In Japan, residents are still recovering from the disaster caused by the earthquake and the following tsunami that occurred in 2011.

Radioactive water was recently discovered leaking from the Fukushima Daiichi Nuclear Power Plant, which suffered a level 7 nuclear meltdown after the tsunami. Japan relies on nuclear power, and many of the country's nuclear reactors remain closed because of stricter seismic safety standards since the earthquake. Four years after the quake, about 230,000 people who lost their homes were still living in temporary housing.

The 2004 Indian Ocean earthquake triggered a series of devastating tsunamis along the coasts of most landmasses bordering the Indian Ocean and killed 200,000 people in 14 countries.

The loss of people lives that occurs during tsunamis is accompanied by enormous industrial and commercial destructions in the coastal areas with waves up to 30 meters. The consequences last much longer as economic losses and health and environmental issues, e.g., as a result of destruction of nuclear power stations.

Attempts have been made heretofore to design and construct various installations and structures in the coastal areas that potentially may be subjected to the effect of the tsunami waves, especially in the highly populated areas.

U.S. Pat. No. 8,931,976 issued on Jan. 12, 2015 to Kawahara, et al. discloses a tsunami breakwater wall of a multilayered steel pipe pile structure that includes a multi-layered steel pipe pile where a bottom end thereof reaches a predetermined depth of a support layer and is installed to the ground such that an upper end thereof protrudes upward from a ground surface, and a wall body constructed integral with a part of the multilayered steel pipe pile that protrudes upward from the ground surface. The multilayered steel pipe pile is made from a plurality of large diameter steel pipe piles of different diameters, an upper end of the inner most side steel pipe pile protrudes upward from the ground surface, and the wall body is constructed to a part of the steel pipe pile protruding upward from the ground surface.

US Patent Application Publication No. 20140227033 published on Aug. 14, 2014 (Inventor: Scheel) discloses a submarine construction for tsunami and flooding protection, for fish farming, and for protection of buildings in the sea. What is proposed is a new technology based on the use of steel fences and anchors and fixed by inserted rocks. It is demonstrated with the example of vertical tsunami barriers extending at least 50 m up to 4 km below sea level. New gained land surface and also the fishing farms between tsunami barrier and shore may compensate most of the costs. Walls and buildings in deep sea may assist deep-sea mining. Vertical walls extending above sea level, preferably protected with hanging triangular structures as surge stoppers, with massive stabilization landward, will replace conventional dikes and levees and will save land areas. Vertical walls of fences extending above sea level, which are circular and filled with rocks, surround pillars to protect off-shore platforms, wind-power plants, bridge pillars and other submarine structures.

European Patent Application Publication EP 2206835 issued on Jul. 14, 2010 (Applicant: Chongqing Qianguang Machinery & Electronics Academy) discloses a breakwater, in which the surface thereof facing the sea is a curved surface rendering the cross section of the breakwater a trapezoid with curved side which comprises a shorter top side, a longer bottom side, and a curved side facing the sea. The curve profile is similar to a recumbent concaved-up parabola.

International Patent Application Publication No. WO 2013035794 A1 issued on Mar. 14, 2013, Inventors: Okumura, et al. discloses a wave-absorbing structure provided with a plurality of columnar blocks disposed in such a way as to lie along a shore line. An adjacent first block and second block from among the plurality of blocks form a water channel linking the offshore side and the shore side, and the distance between a wall surface of the first block and a wall surface of the second block which form the water channel becomes gradually smaller from the offshore side towards the shore side.

Chinese Utility Model Application Publication No. CN203742023 (U) published on Jul. 30, 2014 (Inventors: LYU XILIN, et al.) discloses an anti-tsunami filled wall frame structure comprising a main structure, structural columns, structural beams, filled wall blocks, and tie bars. The main structure is composed of frame columns and frame beams. The structural columns and the structural beam divide the main structure into a mesh; the mesh is filled with the filled wall blocks. The tie bars are laid in mortar joints between the filled wall blocks. The mortar joints for burying the tie bars, mortar joints between the top of the frame beams and the bottom of the filled wall blocks, mortar joints between the top of the structural beams and the bottom of the filled wall blocks, and mortar joints at set heights from the bottommost end of the main structure are all built with water-soluble cement material. Compared with the prior art, the anti-tsunami filled wall frame structure has the advantages that in case of no impact of tsunami, the main structure and the filled wall blocks jointly resist vertical load and horizontal actions such as wind and earthquake; when the structure experiences the impact of tsunami, the water-soluble material of the joints is inactivated, the filled wall blocks fail and fall, the impact of tsunami is released, the impact area of sea water is greatly decreased, and finally the main structure is freed of tsunami destruction.

Russian Patent No. RU 2524814 issued on Feb. 5, 2013 to Nikolaj Jasakov discloses a tsunami damper for protecting banks, coasts, or harbors from the destructive force of tsunami waves. The tsunami damper comprises a block of channels in the form of, for instance, packages of large-diameter pipes, installed on the sea bottom. At the side of the sea compressing deflectors adjoin the end of the channels block, and the upper deflector is strengthened with stiffening ribs, and the lower one rests onto the bottom base, which was previously profiled and reinforced against erosion, and is equipped with anchor joints. A reversible deflector adjoins the other end of the block, at the shore side, having a channeled form and reinforced with support structures with anchor joints. Tsunami waves are damped by impacting them with a strong opposite hydraulic flow, generated on their way with the proposed device, which reduces their destruction energy to the minimum.

SUMMARY OF THE INVENTION

The present invention relates to a method and structure for dampening tsunami waves, in particular to a method and a structure which act on the basis of the phenomenon of a very low tide, or so called "drawdown," "negative wave" or "withdrawal" that precedes arriving of a destructive tsunami wave to the shore line.

In most areas of the world people do not recognize this low-tide phenomenon as a common precursor to tsunami waves and rush to the exposed area to gather fish or to view rock and reef formations never seen under normal sea/ocean conditions. Experts believe that a receding ocean may give individuals more familiar with "nature's tsunami warning signal" as much as a five-minute warning to evacuate the area and to seek higher ground and stay out of danger areas.

Based on the information described above, the inventor herein came to an idea of using the low-tide phenomenon for activating a special mechanism of an anti-tsunami structure which the inventor developed for attenuating the power of the destructive tsunami wave.

The structure of the invention is made in the form of a two-lever mechanism consisting of two lever arms having a fulcrum point on the top of a support member that is firmly secured to the sea/ocean bottom near the shore area which is to be exposed to air when a very low tide occurs as a precursor of a powerful tsunami wave. One lever arm supports a counterweight, and the other lever arm pivotally supports a tsunami wave breaker in the form of a comb-like member, or merely a flat plate, or the like having a large surface area, e.g., from tens to hundreds of square meters. In a normal calm or rough state of the sea/ocean, i.e., when an unusually low tide as a precursor of a tsunami is absent, the structure of the invention is immersed in water and due to selection of weights both lever arms with their respective components are maintained in a state of a slightly positive or neutral buoyancy. In other words, while being in water, the tsunami-wave breaker, which is pivotally attached to the end of the arm opposite to the counterweight, is also maintained in a state of buoyancy and assumes a horizontal position. As soon as a very low tide condition occurs before the arrival of the tsunami wave, the structure is exposed to air, and since the pivotally connected wave breaker is no more supported by the water in a buoyancy state, it turns down in the clockwise direction around its pivot thus reducing the moment on its lever arm. Such a rotation reduces the length of the arm that holds the wave breaker, the counterweight overweighs the opposite arm and raises the letter with the wave breaker that forms a vertically oriented barrier on the way of the tsunami waves thus attenuating the power of these wave.

DETAILED DESCRIPTION OF THE INVENTION

Although tsunamis are commonly known as huge breaking waves with crests towering over the land, in fact, a tsunami can be more accurately described as a rapidly-rising tide without a developed wave face, which quickly floods low-lying coastal areas.

In deep open-ocean water, tsunami waves are normally less than a meter high and travel at very high speeds (up to 1,000 kilometers per hour). However, as a tsunami wave approaches shallower waters along the coast, the leading edge of the wave begins to slow down while the rest of the wave begins to grow in height while maintaining its strength. By the time this wave reaches the shoreline, its crest can reach several meters. However, in many cases, especially when the tsunami originates from an oceanic earthquake, instead of extremely high water levels, the first sign of a tsunami is what appears to be an unusually low-tide, and this major withdrawal of the sea should be taken as a warning that a tsunami wave will soon follow. Such a low tide exposes large territories of the ocean bottom in the coastal areas.

In most areas of the world people do not recognize this low-tide phenomenon as a common precursor to tsunami waves and rush to the exposed area to gather fish or to view rock and reef formations never seen under normal sea/ocean conditions. Experts believe that a receding ocean may give individuals more familiar with "nature's tsunami warning signal" as much as a five-minute warning to evacuate the area and to seek higher ground and stay out of danger areas.

Based on the information described above, the inventor herein came to an idea of using the low-tide phenomenon for activating a special mechanism of an anti-tsunami structure, which the inventor developed for attenuating the power of the destructive tsunami wave.

Figure 1:
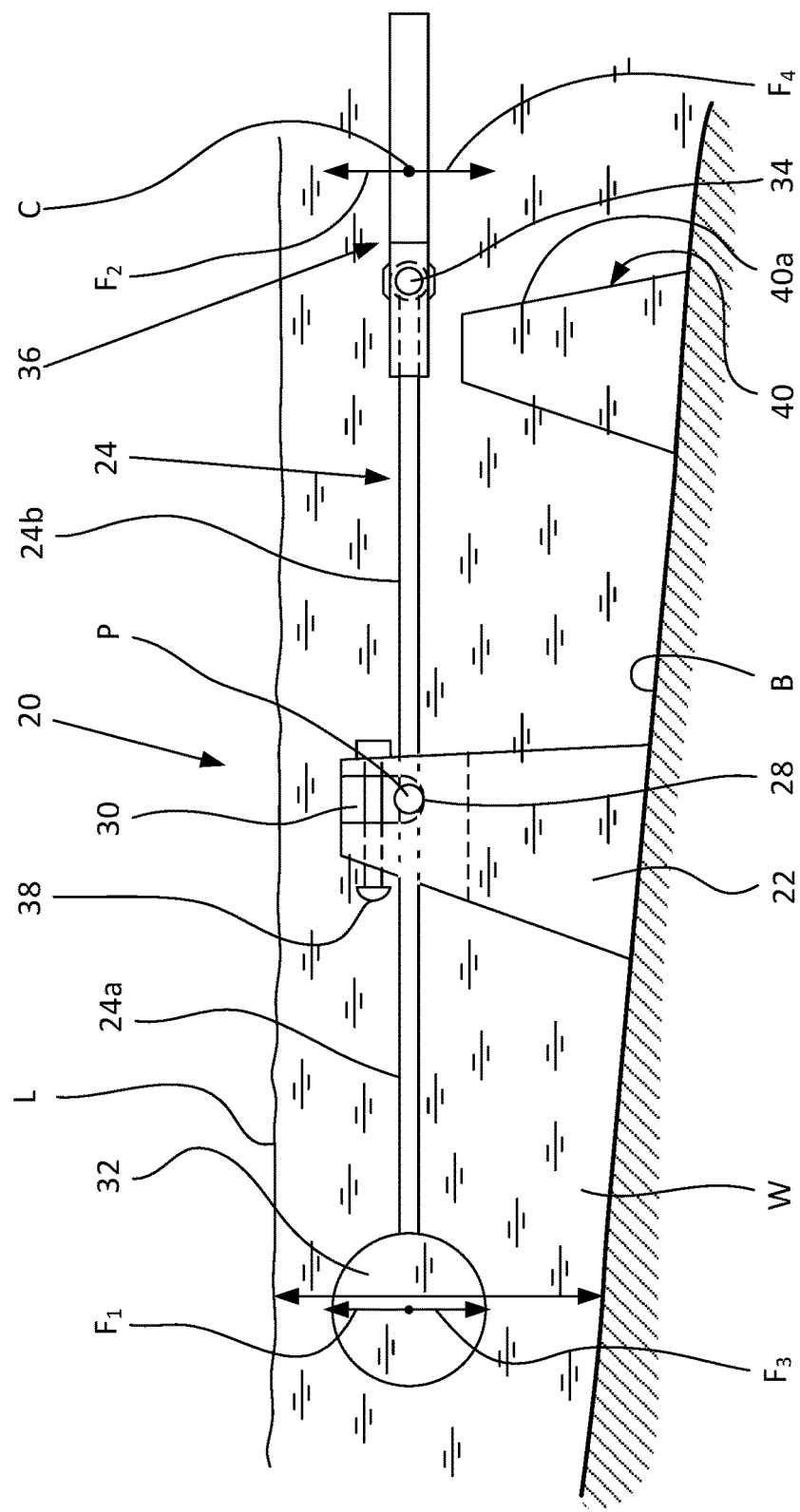
FIG. 1 is a schematic side view of the anti-tsunami structure of the invention under normal ideal non-operating conditions.
Figure 2:
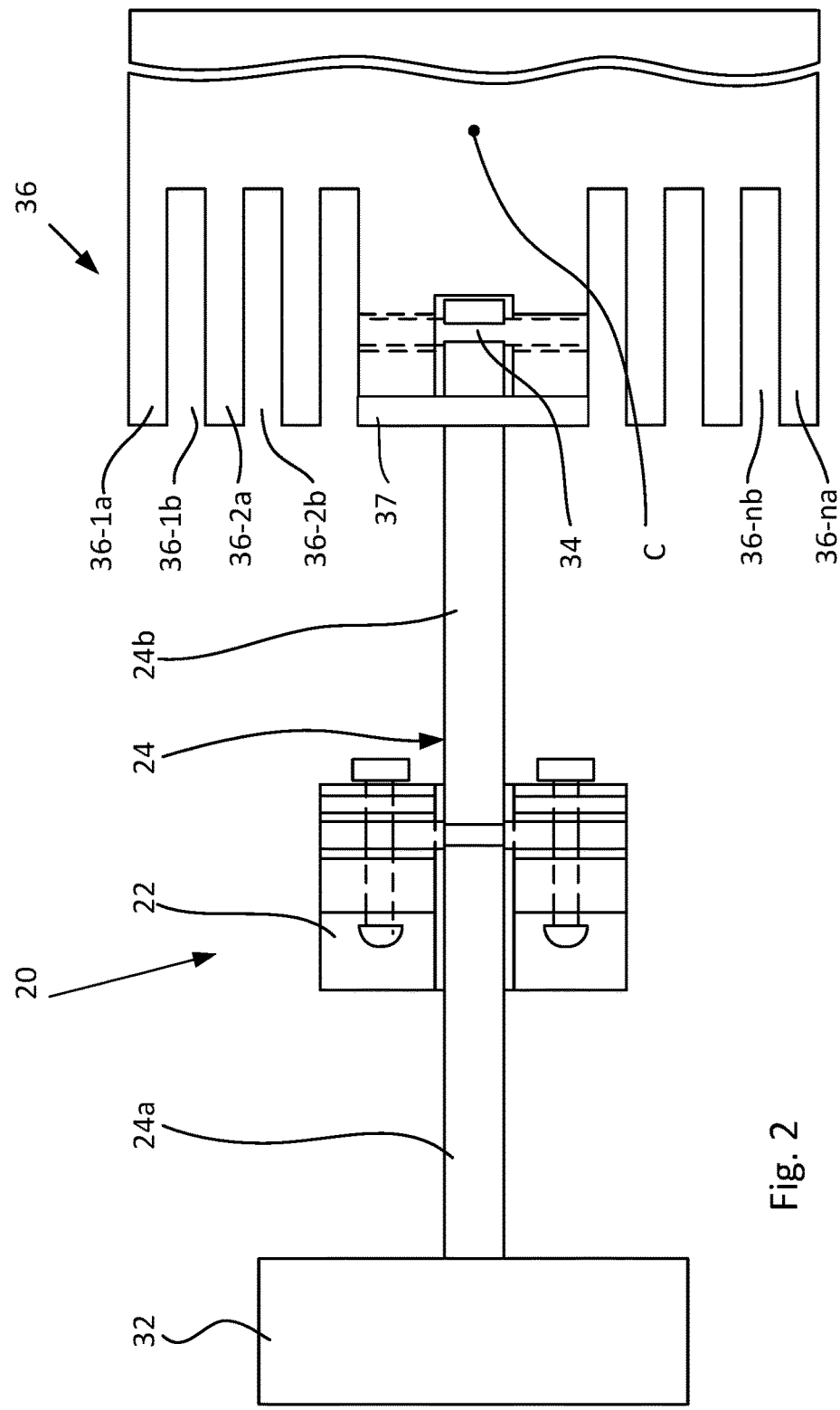
FIG. 2 is a top view of the structure of FIG. 1.
Figure 3:
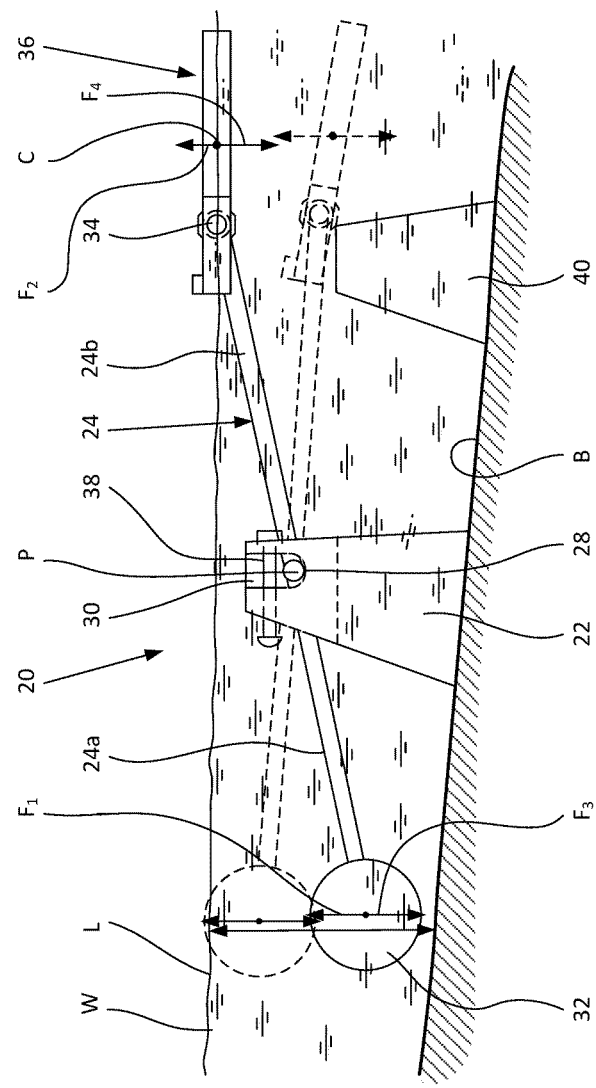
FIG. 3 is the same as FIG. 1 but showing the structure under real conditions with deviations from ideal conditions under effect of underwater currents and disturbances.

The anti-tsunami structure of the invention is shown in the attached drawings, wherein FIG. 1 is a schematic side view of the anti-tsunami structure in a normal ideal non-operating condition (at a normal condition of the sea/ocean water level), FIG. 2 is a top view of the structure, and FIG. 3 is the same as FIG. 1 but showing the structure in real conditions with deviations from the ideal conditions under effect of underwater currents and disturbances.

Figure 4:
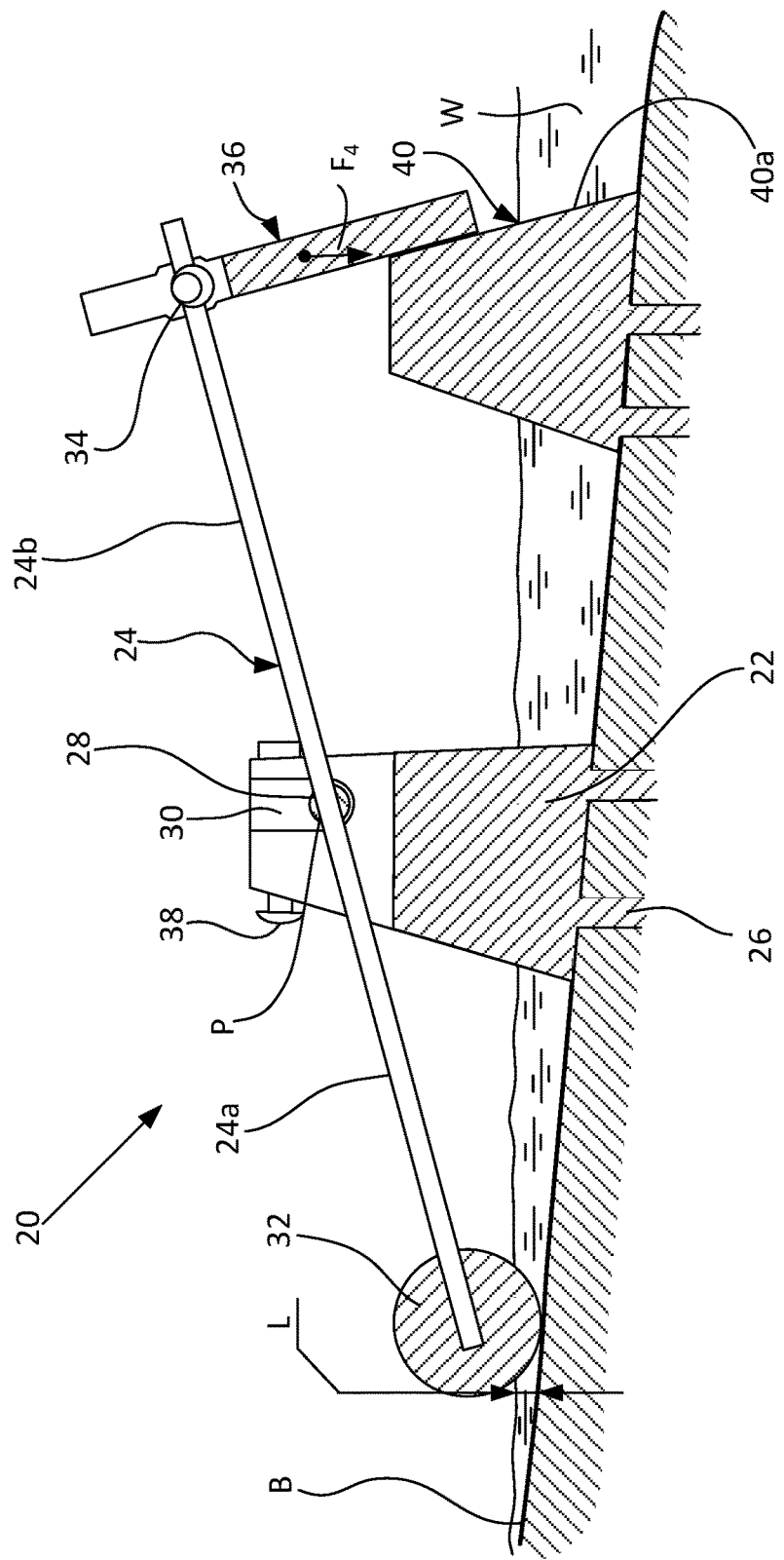
FIG. 4 is a side view similar to FIG. 1 but showing the state of the structure under condition of the low tide that precedes arrival of the tsunami wave.

As can be seen from FIGS. 1 and 3, in a normal (non-operating) state the anti-tsunami structure of the invention (hereinafter referred to simply as a "structure"), which in its entirety is designated by reference numeral 20, is located under water, i.e., below the sea/ocean water level L. The structure 20 or a plurality of such structures (only one of which is shown in the drawings) are installed in the sea/ocean bottom B near the shore (not shown in the drawings) in the area where during the phenomenon of a very low tide, or so called "drawdown," "negative wave" or "withdrawal" that precedes arriving of a destructive tsunami wave to the shore line the structure 20 will be exposed to the air. Such an exposed condition of the structure, which hereinafter will be referred to as a "working condition" of the structure 20, is shown in FIG. 4. This drawing also is a side view of the structure 20.

As shown in FIGS. 1 and 3, the structure 20 consists of a ground support 22, which is firmly secured to the ground of the sea/ocean bottom B by methods known in the art of underwater structures, and a two-lever mechanism 24 having a fulcrum point P at the top of the ground support 22.

The ground support 22 may be secured to the bottom B, e.g., by piles 26 which may be driven into the ground, e.g., by a method for construction of underwater foundations for buildings described in U.S. Pat. No. 9,222,233 issued to Peters on Dec. 29, 2015. Other similar methods used for building bridge foundations can be used in this case.

The two-lever mechanism 24 comprises a first lever arm 24a and a second lever arm 24b with a fulcrum point P between them in the form of a horizontal shaft 28 freely installed in a vertical slot 30, which is formed at the upper end of the support 22. The free end of the first lever arm 24a supports a counterweight 32, while the free end of the second lever art 24b pivotally supports on a tsunami wave-breaker pivot 34 a wave-breaking member 36. It is essential for reliable operation of the entire structure 20 that center of mass C (FIG. 1 and FIG. 3) of the wave-breaking member 36 is shifted closer to the free end of the second lever arm 24b. The entire two-lever mechanism 24 has such positions of the center of masses of all components (the counterweight 32, the first lever arm 24a, the second lever arm 24b, the wave-breaking member 36, etc.) which allows the two-lever mechanism 24 to maintain a balanced state when the mechanism is immersed in water.

What is meant under the term "balanced state" is that while being immersed in water the entire two-lever mechanism 24 is maintained in a floating state in the horizontal position or a near the horizontal position, although in reality this mechanism will experience the effect of underwater currencies and flows which will deviate the mechanism from the ideal horizontal position, which is shown in FIG. 3 by solid and broken lines. It is preferable that the two-lever mechanism 24 has a slightly positive or neutral floatability, i.e., the materials of the mechanism should have density close to or slightly higher than density of sea water. In other words, when immersed in water, the parts of the material of the two-lever mechanism 24 should possess neutral or positive near neutral buoyancy. Such a material may comprise a foam concrete, or the like, or these may be special structural elements with water-filled chambers.

In order to prevent the two-lever mechanism 24 from floating up above the level of the vertical slot 30, the structure is provided with a stopper 38 (FIGS. 1 and 3) that extends across the vertical slot 30 above the horizontal shaft 28.

Symbols F1 and F2 designate buoyancy forces acting on the counterweight and the wave-breaking member 36, respectively, and symbols F3 and F4 designate gravity forces of the same components. The gravity forces and the volumes of the mentioned parts are selected so that these parts, when they are in water, are maintained in the state of neutral or a slightly positive buoyancy, i.e., these parts are always tending to slowly float up. In other words, in order to provide automatic reset of the mechanism 24 to the initial condition shown in FIGS. 1 and 3 after the tsunami is over and water returns to its normal calm condition, it is preferable to provide the parts of the mechanism 24 with a positive buoyancy. This will be described in more detail with reference to the operation of the system 20.

In general, in the ideal case all movable elements of the structure 20 (i.e., the counterweight 32, the first lever arm 24a, the second lever arm 24b, the wave-breaking member 36, etc.) should have neutral buoyancy. Neutral buoyancy is a condition in which a physical body's average density is equal to the density of the fluid in which it is immersed.

Reference numeral 40 designates a limit stopper the purpose and function of which are explained below in the description of the structure operation which follows with reference to FIGS. 4 and 5.

As can be seen from FIG. 2, which is a top view of the structure 20, the wave-breaking member 36 has a comb-like configuration with teeth 36-1a, 36-2a, 36-na and spaces 36-1b, 36-2b, 36-nb. It is understood that for convenience of the explanation and simplicity of the drawings the arms 24a and 24b are shown as elongated levers only as an example and that they may be as wide as the wave-breaker member 36. Furthermore, the wave-breaker member may not necessarily have a comb-like configuration and may comprise just a flat plate, or the like.

The tsunami-facing side of the tsunami-wave breaker may have the surface are as large as from several square meters to several hundred square meters.

Figure 5:
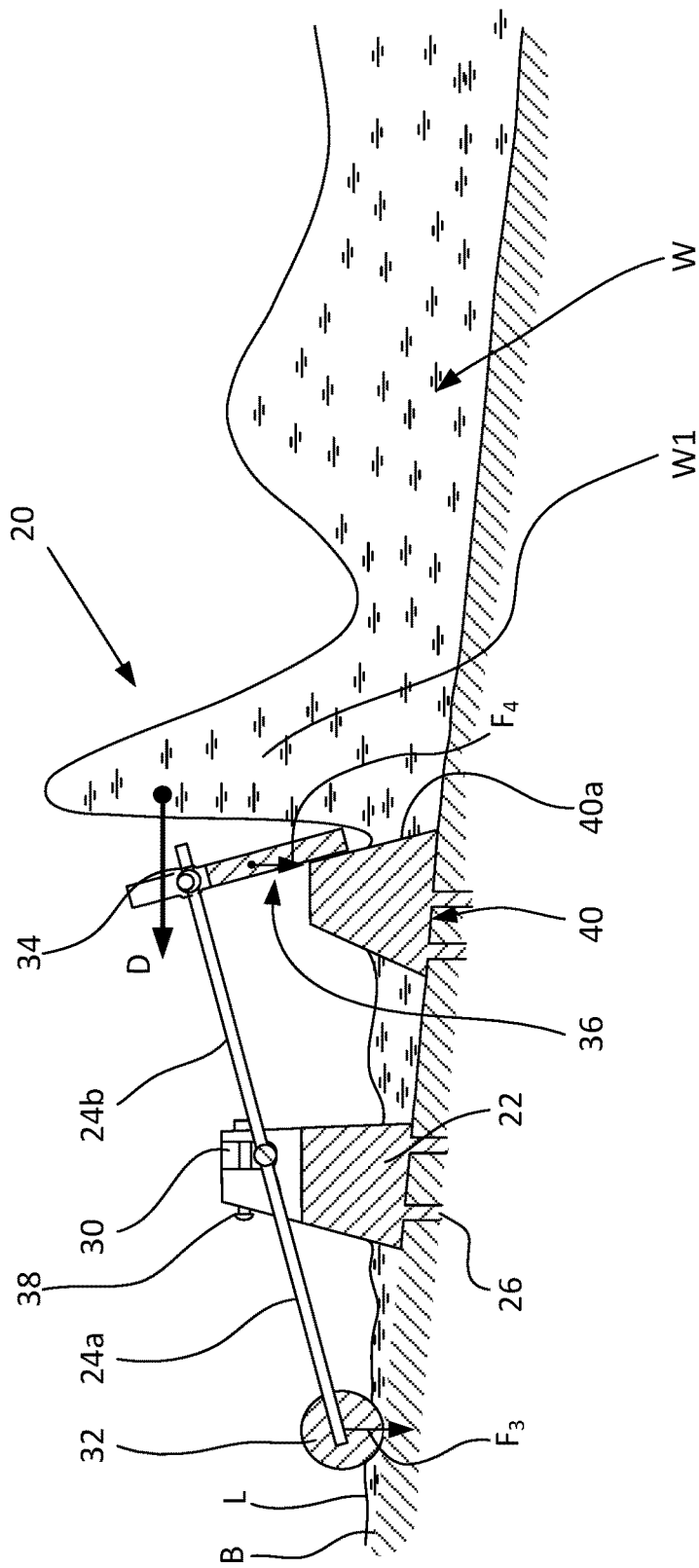
FIG. 5 is a view similar to FIG. 1 but showing the interaction of the structure with the front of the main tsunami wave.

FIG. 4 shows the state of the structure 20 under condition of the low tide that precedes arrival of the tsunami wave, and FIG. 5 shows the interaction of the structure 20 with the main tsunami wave.

It is recommended for the purpose of return of the mechanism 24 to a pre-tsunami condition shown in FIGS. 1 and 3 when the tsunami time is over, the tsunami-facing side 40a of the limit stopper 40 should be inclined from the vertical direction toward the support 22. Furthermore, in order to prevent the tsunami-wave breaker 36 from turning in the counterclockwise direction to the non-reversible position (i.e., against rotation by an angle exceeding 180 degrees), the mechanism 24 is provided with an excessive-tilt stopper 37 installed on the tsunami-wave breaker 36 so that when the tsunami-wave breaker 36 turns into substantially vertical position, it comes into contact with the excessive-tilt stopper 37 and is prevented from tilting further over the vertical position.

The structure 20 of the invention operates as described below.

When the sea/ocean is under normal conditions (calm or rough), and the structure 20 is located under water in the state shown in FIGS. 1 and 3, all the elements of the structure 20 are maintained in the state of a slightly positive or neutral buoyancy.

However, when the condition of an extremely low tide as a precursor of a tsunami occurs near the shore line so that the structure 20 is exposed to the air as shown in FIG. 4, the wave-breaking member 36, which in this case is not supported by buoyancy, will turn down around its pivot 34 and will be kept against further rotation into the clockwise direction by the inclined surface 40a of the limit stopper 40. As a result, a comb-like upper part of the wave-breaking member 36 with the teeth 36-1a, 36-2a, . . . 36na and spaces 36-1b, 36-2b, . . . 36nb will stay in a substantially vertical position on the way of the tsunamis and meet in this position the most powerful tsunami wave W1 that arrives in the direction D. When the tsunami wave passes through the spaces 36-1b, 36-2b, . . . 36nb, the wave loses its power due to viscous friction on the surfaces of the teeth 36-1a, 36-2a, . . . 35na.

The turning and maintaining of the wave-breaking member 36 will occur because exposure of the structure 20 to the air will change the balance of moments acting on the first and second lever arms 24a and 24b since the turning of the wave-breaking member 36 down from the balanced position will reduce the length of the arm 24b and hence the moment on this arm as compared to the moment developed by the counterweight 32 on the first lever arm 24a. The more so, when the counterweight 32 lays on the shore ground and is free of the buoyancy force F1, it is kept stable in the turned down position.

A collision of the wave W1 and subsequent waves with the wave breaker 36 will reduce the power of the destructive wave W1 and the following tsunami waves.

Figure 6:
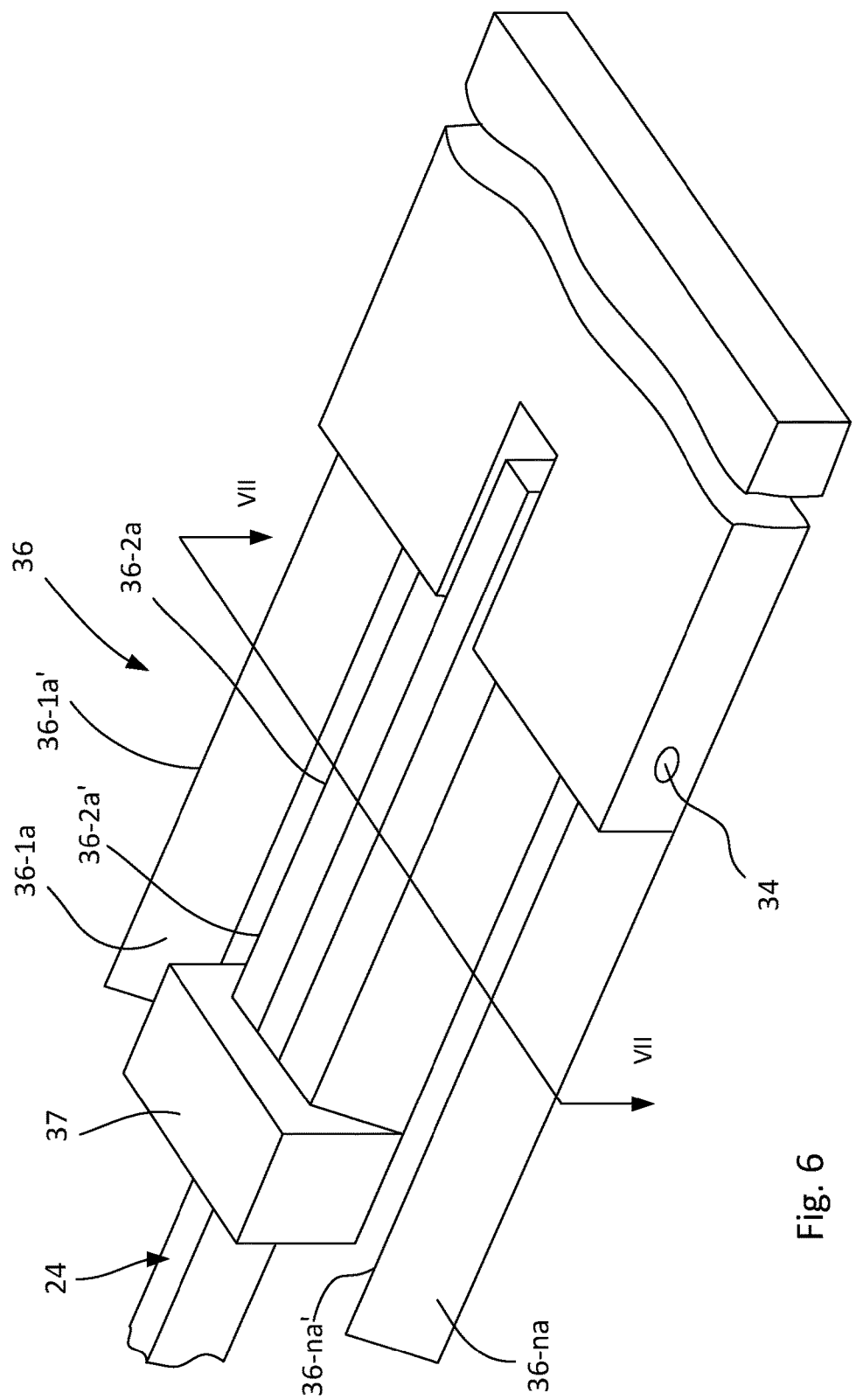
FIG. 6 is a three-dimensional view of the tsunami-wave breaker.

The teeth 36a-1, 36a-2 . . . 36na shown in FIG. 2 may have different cross-sectional profiles and methods of attachment. An example of such a profile and method of attachment to the end of the lever 24b is shown in FIGS. 6 and 7, where FIG. 6 is a three-dimensional view of the wave-breaking member 36, and FIG. 7 is a cross-sectional view along the line VII-VII of FIG. 6.

Figure 7:
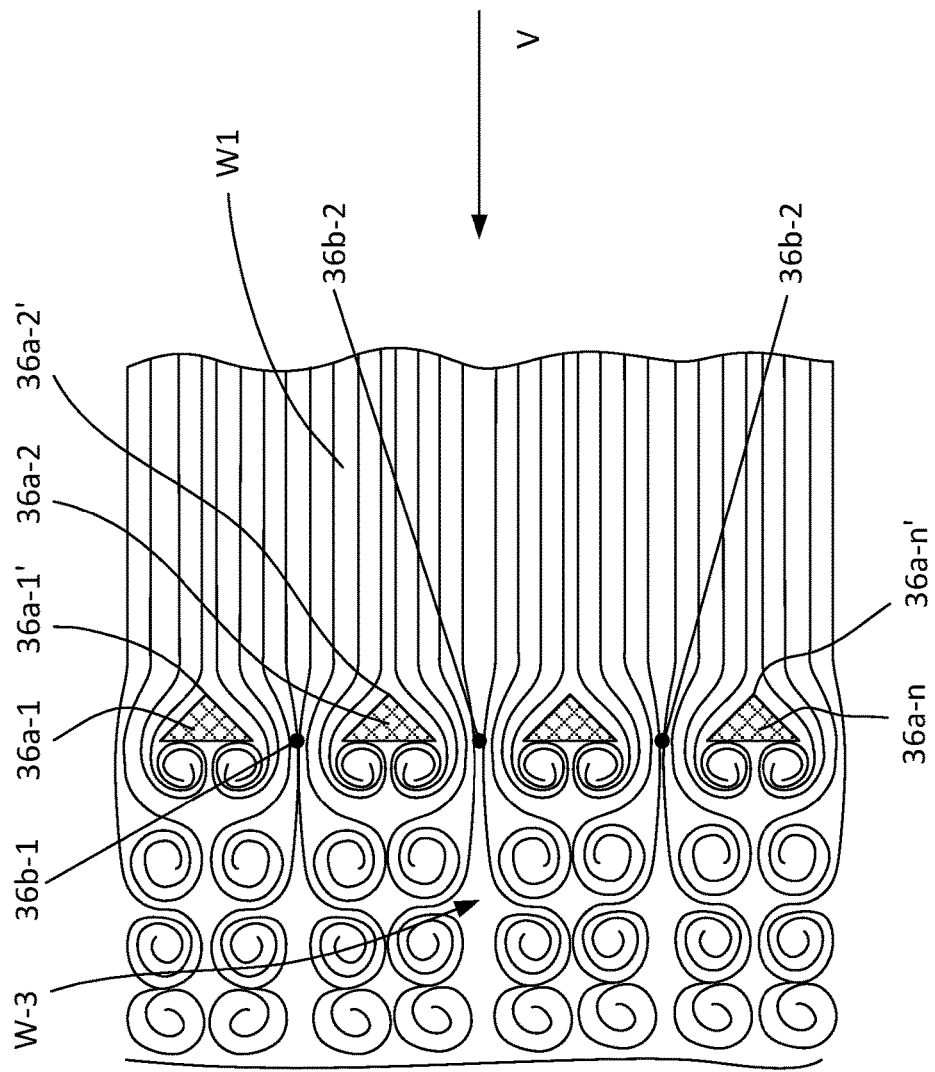
FIG. 7 is a cross-sectional view along the line VII-VII of FIG. 6.

It can be seen from FIG. 7 that in cross section perpendicular to the plane of the wave-breaking member 36, the teeth 36a-1, 36a-2 . . . 36-na have a triangular profile with the apices 36a-1', 36a-2', . . . 36-na' of the triangles facing the direction from which the tsunami wave W1 has to arrive. In FIG. 6 the teeth elements are shown integral with the plate-like member of the tsunami-wave breaker 36. However, the teeth elements may be attachable and replaceable. The triangular profile is shown as an example, and other profiles optimal for alleviation of the power of the tsunami wave can be used. In particular, as shown in FIG. 7, the wave power attenuation effect is achieved due to the fact that after the laminar flows of water pass through spaces 36-1b, 36-2b, . . . 36-nb the profiled teeth convert the laminar flow into a turbulent flow W-3, whereby the longitudinal pulse carried by the wave in the direction V toward the cost line (not shown) is reduced.

When the tsunami event is over and the sea/ocean level L returns to its normal condition at which the entire structure 20 is again immersed in water, the mechanism 24 automatically returns to the position shown in FIGS. 1 and 3 since the tsunami-wave breaker 36 will experience the effect of the buoyant force and since the inclined position of the wave breaker 36 will promote the rotation of the tsunami-wave breaker 36 in the counterclockwise direction.

The present invention also provides a method for dampening tsunami waves. The method consists of installing a support structure in the bottom of the sea/ocean in the near-shore area which is exposed to the air at the time of a low tide which takes place shortly before the arriving of a tsunami wave, and installing on that support structure a tsunami-breaking structure which has a mechanism that possesses a slightly positive or neutral buoyancy state when immersed in water, and which changes its state and assumes a tsunami breaking position, when it is exposed to the air at the time of low tide that precedes the tsunami. This is achieved by making the tsunami-breaking structure in the form of a two lever mechanism having a first lever arm and a second lever arm with a fulcrum point between the both arms located at the top of the supports structure. One lever arm holds on its free end a counterweight, and the other lever arm holds a pivotally supported tsunami-wave breaker in the form of a plate with or without wave-breaking elements. The method includes the steps of making the components of the tsunami-braking structure from a material having a density equal to or slightly lower than the density of water into which the tsunami-braking structure is immersed and providing a balance between the parts of the tsunami-braking structure on both sides of the structure relative to the fulcrum point when the structure is immersed in the water. Since the tsunami-wave breaker is connected to the end of the respective lever arm pivotally, when the structure is exposed to the air, the tsunami-wave breaker, which in the air-exposed state loses its buoyancy, turns down in the clockwise direction under the action of its own gravity. This action reduces the length of the arm and hence the moment on the arm that holds the tsunami-wave breaker, whereby the counterweight-holding arm descends to the ground, and the tsunami-wave breaker is raised up and assumes a substantially vertical position in which it is ready to confront the tsunami wave.

Although the method and structure of the present invention have been described and illustrated by way of specific examples, it is understood that these examples should not be considered as limiting the application of the invention and that any changes and modifications can be made within the scope of the attached patent claims. For example, the entire tsunami-wave breaker 36 may have different shapes, e.g., rectangular, trapezoidal, oval, or the like. The tsunami-wave breaker 36 may be made flat without teeth or with teeth and may be made in the form of a platform having a length of several tens or hundred meters. The tsunami-wave breaker 36 is not necessarily flat and may be curved with the curvature toward the tsunami wave. The structure may have different dimensions and weights which may reach several tens of tons. A plurality of structures 20 may be combined in a system with various patterns of arrangement in the near-shore area.

The invention claimed is:

1. A structure for dampening tsunami waves comprising:
a support structure, which is installed in the bottom of the sea/ocean in the negative wave area that precedes arriving of a destructive tsunami wave, immersed in the water when there is no tsunami, and exposed to the air at the time of the negative wave;
a lever mechanism installed on the support structure and having a first lever arm, a second lever arm, and a fulcrum point between the both arms located on the supports structure;
a counterweight held by the first lever arm;
a tsunami-wave breaker pivotally supported by the second lever arm and a tsunami-wave breaker pivot for pivotally supporting the tsunami-wave breaker by the second lever arm; and
an excessive-tilt stopper installed on the second lever arm and preventing the tsunami-wave breaker from turning and tilting further over the vertical position;
the lever mechanism being made from materials having a density approximately equal to the density of water into which the lever mechanism is immersed, and the moments on the first lever arm and the second lever arm are equal to each other when the lever mechanism is immersed in the water so that in the water-immersed state both lever arms possess buoyancy approximately close to neutral.

2. The structure according to claim 1, wherein the support structure has a vertical slot and wherein a fulcrum point is formed by a horizontal shaft inserted into the vertical slot.

3. The structure according to claim 2, wherein the support structure is further provided with a stopper which is inserted into the slot above the horizontal shaft for preventing the horizontal shaft from going out from the vertical slot.

4. The structure according to claim 3, further provided with a vertical limit stopper installed in the bottom of the sea/ocean between the support structure and the tsunami-wave breaker pivot for limiting the turn of the tsunami-wave breaker in the clockwise direction when the structure is exposed to the air, the vertical limit stopper having a tsunami-facing side which is inclined from the vertical direction toward the support.

5. The structure according to claim 4, wherein the tsunami-wave breaker comprises a plate-like member that has a tsunami-facing side.

6. The structure according to claim 5, wherein the plate-like member has a plurality of teeth and spaces between the teeth.

7. The structure according the claim 6, wherein on the tsunami-facing-side the teeth are profiled.

8. The structure according to claim 7, wherein in a transverse cross section the teeth have a triangular profile.

9. The structure according to claim 8, wherein the tsunami-wave breaker has an excessive-tilt stopper that prevents the tsunami-wave breaker from tilting further to the support.

10. The structure according to claim 2, further provided with a vertical limit stopper installed in the bottom of the sea/ocean between the support structure and the tsunami-wave breaker pivot for limiting the turn of the tsunami-wave breaker in the clockwise direction when the structure is exposed to the air, the vertical limit stopper having a tsunami-facing side which is inclined from the vertical direction toward the support.

11. The structure according to claim 1, wherein the tsunami-wave breaker comprises a plate-like member that has a tsunami-facing side.

12. The structure according to claim 11, wherein the plate-like member has a plurality of teeth and spaces between the teeth.

13. The structure according the claim 12, wherein on the tsunami-facing-side the teeth are profiled.

14. The structure according to claim 13, wherein in a transverse cross section the teeth have a triangular profile.

15. A method for dampening tsunami waves comprising the steps of:
providing a structure for dampening tsunami waves comprising a support structure, which has a tsunami-wave breaker and is installed in the bottom of the sea/ocean in in the negative wave area that precedes arriving of a destructive tsunami wave, immersed in the water when there is no tsunami; and exposed to the air at the time of the negative wave; and which, when exposed to air, automatically assumes a tsunami-wave dampening position under the effect of its own gravity;
providing the structure with an excessive-tilt stopper for preventing the tsunami-wave breaker from turning and tilting further over the vertical position;
providing the structure with a vertical limit stopper installed in the bottom of the sea/ocean for limiting the turn of the tsunami-wave breaker in the clockwise direction when the structure is exposed to the air, the vertical limit stopper having a tsunami-facing side which is inclined from the vertical direction toward the support; and
installing the structure for dampening tsunami waves in the bottom of the sea/ocean in the time of a negative wave.

16. The method of claim 15, further providing the step of maintaining the structure for dampening tsunami waves under water in a state of neutral or near neutral buoyancy.

17. The method according to claim 16 comprising the step of making the structure for dampening tsunami waves in the form of a support structure for installing in the bottom of the sea/ocean in said near-shore area, a lever mechanism installed on the support structure and having a first lever arm, a second lever arm, a fulcrum point between the both arms located on the supports structure, a counterweight held by the first lever arm, and a tsunami-wave breaker pivot for pivotally supporting the tsunami-wave breaker on the second lever arm.

18. The method according to claim 17, further comprising the step of making the lever mechanism from materials having a density close to or lighter than the density of water into which the lever mechanism is immersed, and providing the moments on the first lever arm and the second lever arm equal to each other when the lever mechanism is immersed in the water so that in the water-immersed state both lever arms possess neutral or positive near neutral buoyancy which is lost when the structure for dampening tsunami waves is exposed to air whereby shortening of the moment on the second lever arm due to turning of the a tsunami-wave breaker around the tsunami-wave breaker pivot in the clockwise direction allows the counterweight to descend toward the bottom of the sea/ocean and to raise the tsunami-wave breaker to the tsunami-wave dampening position.

* * * * *